Patented Jan. 30, 1934

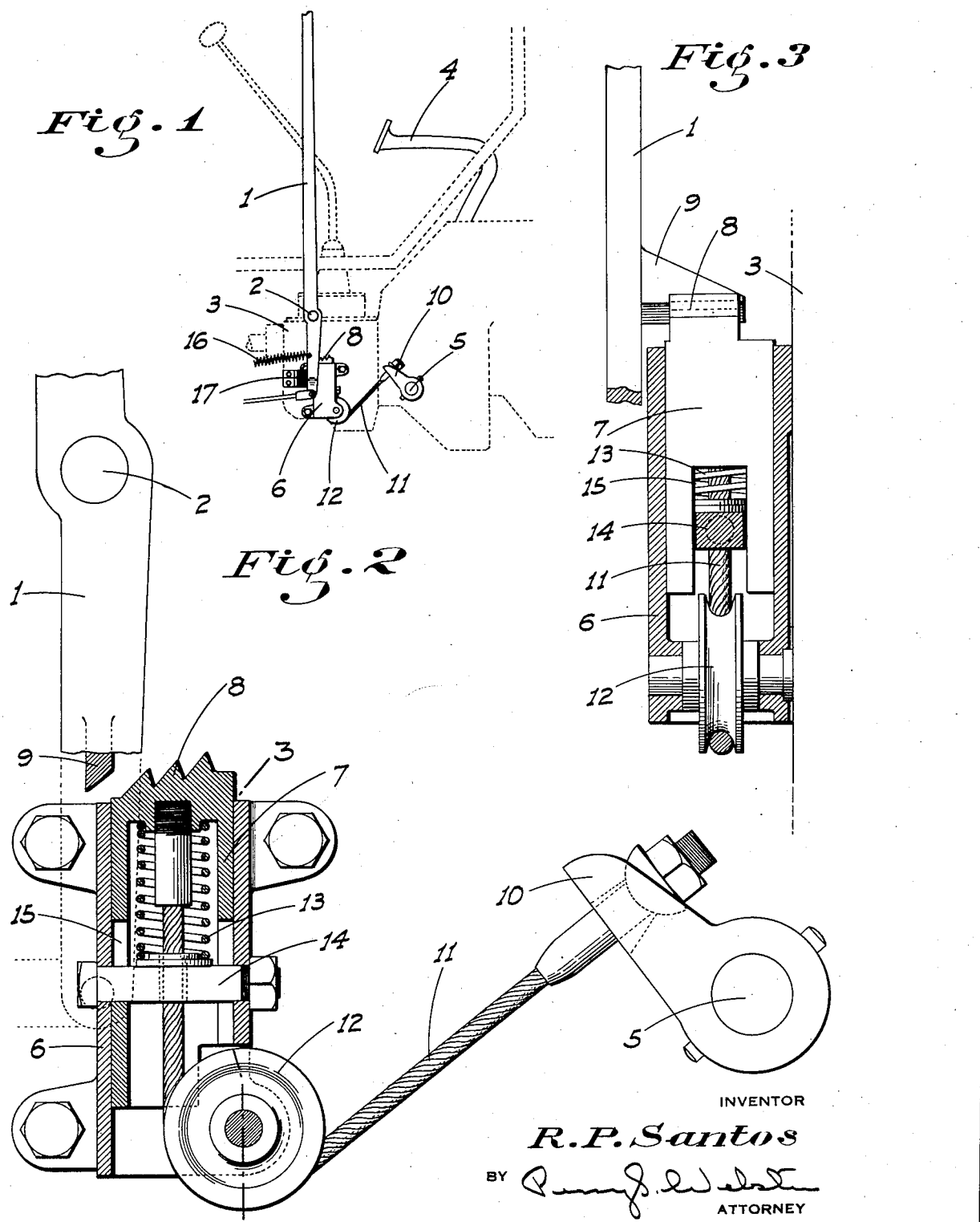

1,945,083

UNITED STATES PATENT OFFICE 1,945,083

AUTOMATIC RELEASE FOR EMERGENCY BRAKES

Richard P. Santos, Stockton, Calif., assignor of one-third to Elmer E. Tucker and one-third to Ernest H. Santos, both of Stockton, Calif.

Application January 14, 1933. Serial No. 651,699

2 Claims. (Cl. 74—39)

This invention relates to holding means for the emergency or parking brakes of automobiles. It is customary to set this brake when leaving a car either to prevent the same from being pushed along the street from the exterior or from rolling of itself if left on an incline. When the car is again started the brake must be released by hand. This however is something which is rather frequently overlooked by a driver and he attempts to start the car without releasing the brake, resulting in stalling the engine or burning the brake lining before he discovers his omission.

The principal object of my invention is to prevent this possible forgetfulness of the driver from doing any harm by providing a holding means for the brake lever so arranged that the brake will be automatically released by the depression of the clutch pedal. Since all cars whether equipped with free wheeling devices or not require the clutch pedal being depressed before the car can be initially started, the brake will always be released before the car is actually put in motion.

My improved device also permits of easier release of the brake than is now sometimes possible, especially after the brake has been set hard, which at present requires a strong pressure on the hand grip to effectively release the holding pawl, and which grip and its associated parts are now eliminated. My improved brake releasing mechanism, apart from the previously mentioned features of advantage, will especially appeal to women drivers, since they can readily exert sufficient pressure with the foot to release the brake even if their hands are weak.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Fig. 1 is a fragmentary side outline of a parking brake lever as mounted in a conventional position in connection with the transmission housing of a motor vehicle, showing my improved lever holding and release means applied thereto.

Fig. 2 is a sectional elevation of the device.

Fig. 3 is a transverse vertical section on the line 3—3 of Fig. 1.

Referring now more particularly to the characters of reference on the drawing, the numeral 1 denotes the actuating lever of the parking or emergency brake of an automobile which is pivoted toward its lower end as at 2 on one side of the transmission housing 3 of the power unit of the vehicle as is now customary.

The clutch pedal 4 is pushed forwardly to throw out the clutch and is connected to a transverse shaft 5 (on which the throw out fork is mounted) and which is journaled in and projects somewhat from the same side of the clutch housing as that on which the lever is disposed. The above parts are standard in one form or another in the great majority of motor vehicles and as the clutch pedal is depressed the shaft 5 is rotated so that its upper side turns forwardly.

This movement is utilized to effect release of the lever holding means in the following manner.

Mounted against the housing 3 just forwardly of the lever 1 when the latter is in a release position is a vertical casing 6, the lever being outwardly of the casing in a plane transversely of the vehicle as shown in Fig. 3. Slidable in the casing is a hollow plunger 7 which is open on the bottom and is provided on its upper end, in a position normally above the casing, with a row of ratchet teeth 8. These are adapted to cooperate with a rigid pawl or lug 9 secured on and projecting laterally from the lever in overhanging relation to the plunger. The teeth 8 are of course disposed in a path concentric with the lever shaft 2 so that the lug 9 will engage said teeth with equal effectiveness regardless of the degree to which the lever will be turned.

Secured on and projecting radially and upwardly from the outer end of the shaft 5 is an arm 10, to which one end of a cable 11 or other flexible element is adjustably connected. The cable passes over a sheave 12 mounted on the front side of the casing 6 at the bottom and extends thence upwardly to a connection with the head of the plunger 7. A compression spring 13 inside the plunger and about the upper portion of the cable bears at its upper end against the head of the plunger and at its lower end against a lateral bar 14 mounted in the casing 6 and through which the cable projects. The sides of the plunger have vertical slots 15 through which the bar extends and which limit the vertical movement of the plunger.

In operation with the brake lever in its released position and with the clutch pedal in its normal position the lug 9 is back of the row of teeth 8 and the plunger 7 is in its uppermost position. As the lever is pulled rearwardly to set the brake its lower portion moves forwardly, the lug 9 passing over the teeth 8 and depressing the plunger until it reaches its set position. The number of teeth may be varied but a relatively few teeth will suffice to enable different adjustments of the brake and consequently different degrees of movement of the lever to be had, while insuring that the lever lug will engage one tooth or another when the brake is set. With this construction therefore the brake will be held as firmly as with the present hand pawl and ratchet arrangement.

When the clutch pedal is depressed however as when the car is to be started, the accompanying rotation of the shaft 5 and the consequent pull on the cable 11 will immediately depress the plunger so as to pull the teeth 8 directly down and clear of engagement with the lug 9. The lever therefore is instantly released and the pull spring 16 connected to the same as usual is then free to act to pull the lever to its normal released position. The lever on reaching said position engages a fixed cushion or bumper block 17 mounted in any suitable position so as to prevent the releasing movement of the lever being accompanied by an excessive banging noise and shock.

It will be seen that the holding and releasing device is invaluable in operation and the present unsightly and sometimes unwieldy hand grip and the adjacent parts are eliminated. The length of the slots 15 is greater than necessary to just release the teeth from the lug, or in other words, sufficient to allow of full depression of the pedal without tending to stretch the cable, whereas a normal or partial depression of the pedal will be sufficient to effect release of the teeth from the lever lug.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a motor vehicle having a brake lever, a depressible clutch element and a shaft rotated by a depressing movement of the element, a catch lug on the lever, a tooth member for engagement with the lug when the lever is moved to a brake setting position, a fixed support in which the member is slidably mounted for movement away from the lug, an arm projecting from the shaft, a sheave on the support beyond the member, and a flexible element connected to the member and arm and passing about the sheave.

2. In a motor vehicle having a pivoted brake lever and a depressible clutch element, a catch lug on the lever to one side of the same and below its pivot, a tooth member for engagement with the lug when the lever is moved to a brake setting position, a fixed support in which said member is slidably mounted for movement away from the lug, a spring mounted in the support beyond and engaging the member to yieldably force the same toward the lug, a flexible element connected at one end to the member and extending through the spring to pull said member directly away from the lug in opposition to the spring pressure, and means operatively connecting the other end of the flexible element to the clutch element to thus pull said flexible element when the clutch element is depressed.

RICHARD P. SANTOS.